United States Patent
Kaufmann et al.

(10) Patent No.: US 11,410,115 B2
(45) Date of Patent: Aug. 9, 2022

(54) SCRAPING NETWORK SITES TO ARRANGE EXPEDITED DELIVERY SERVICES FOR ITEMS

(71) Applicant: International Business Machines Corporation, Armonk, NY (US)

(72) Inventors: John Kaufmann, Austin, TX (US); Borja Canseco, Austin, TX (US); Andrea Young, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 16/127,866

(22) Filed: Sep. 11, 2018

(65) Prior Publication Data
US 2020/0082331 A1    Mar. 12, 2020

(51) Int. Cl.
*G06Q 10/08*    (2012.01)

(52) U.S. Cl.
CPC ..... *G06Q 10/0833* (2013.01); *G06Q 10/0836* (2013.01)

(58) Field of Classification Search
CPC .. G06Q 30/00–06; G06Q 10/08; G06Q 40/00; G06Q 10/00; G06Q 20/00; G06F 7/00; G06F 17/30; G06F 9/445; G06F 16/532
USPC ......... 705/26.81, 27.1, 28, 26.1, 400, 26.61, 705/26.63, 14.54, 14.66, 14.4, 14.71, 37, 705/333, 26.7; 707/728, 729, 731
See application file for complete search history.

(56) References Cited

U.S. PATENT DOCUMENTS

| | | | |
|---|---|---|---|
| 8,583,639 B2 * | 11/2013 | Chitnis | G06F 16/951 707/731 |
| 9,710,779 B1 | 7/2017 | Maloney | |
| 9,727,837 B1 * | 8/2017 | Campbell, Jr. | G06Q 10/087 |
| 9,760,854 B1 * | 9/2017 | Chowdhary | G06Q 10/0837 |
| 9,865,000 B1 * | 1/2018 | Lopez | G06Q 30/0201 |
| 10,152,734 B1 * | 12/2018 | Nath | G06Q 30/0277 |

(Continued)

FOREIGN PATENT DOCUMENTS

WO    2006086877 A1    8/2006

OTHER PUBLICATIONS

Iris Lin, and Hani Mahmassani, "Can Online Grocers Deliver? Some Logistics Considerations," Transportation Research Record 1817, Paper No. 02-2605, Journal of the Transportation Research Board 1817, 2002, pp. 17-24.

(Continued)

*Primary Examiner* — Olusegun Goyea
(74) *Attorney, Agent, or Firm* — Edell, Shapiro & Finnan, LLC

(57) ABSTRACT

A computer system monitors network sites to provide expedited delivery services. Operation of a network site is monitored to determine that an item is being obtained from the network site. The network site is scraped to determine that the item is available at a physical location associated with the network site. A courier service is identified to transport the item from the physical location to the delivery location. Delivery of the item is enabled by the courier service to the delivery location. Embodiments of the present invention further include a method and program product for monitoring network sites to provide expedited delivery services in substantially the same manner described above.

18 Claims, 4 Drawing Sheets

(56) References Cited

U.S. PATENT DOCUMENTS

| | | | |
|---|---|---|---|
| 2002/0103724 A1* | 8/2002 | Huxter | G06Q 30/02 705/28 |
| 2002/0143655 A1* | 10/2002 | Elston | G06Q 20/04 705/26.81 |
| 2003/0093388 A1* | 5/2003 | Albright | G06Q 30/06 705/400 |
| 2003/0171996 A1* | 9/2003 | Chen | G06Q 30/0641 705/26.81 |
| 2003/0177072 A1* | 9/2003 | Bared | G06Q 30/0623 705/26.81 |
| 2004/0030572 A1* | 2/2004 | Campbell | G01C 21/26 705/333 |
| 2004/0212833 A1* | 10/2004 | Taskett | G06Q 10/08 358/1.18 |
| 2006/0122899 A1* | 6/2006 | Lee | G06Q 30/0625 705/26.81 |
| 2007/0198459 A1* | 8/2007 | Boone | G06F 16/9535 707/E17.093 |
| 2008/0140530 A1* | 6/2008 | Van Luchene | G06Q 30/0601 705/26.1 |
| 2008/0195523 A1* | 8/2008 | Rabenold | G06Q 40/04 705/37 |
| 2010/0042510 A1* | 2/2010 | Zeinfeld | G06Q 30/0641 705/28 |
| 2011/0040642 A1* | 2/2011 | O'Dell | G06Q 30/02 705/26.1 |
| 2013/0066740 A1* | 3/2013 | Ouimet | G06Q 30/02 705/26.7 |
| 2013/0325636 A1* | 12/2013 | Carter | G06Q 30/0277 705/14.71 |
| 2014/0095350 A1* | 4/2014 | Carr | G06Q 30/0603 705/26.8 |
| 2014/0172737 A1* | 6/2014 | Conjepuram | G06Q 10/0834 705/333 |
| 2014/0279657 A1* | 9/2014 | Stowe | G06Q 10/08345 705/335 |
| 2014/0324725 A1* | 10/2014 | Edmonds | G06Q 10/0835 705/333 |
| 2015/0186869 A1* | 7/2015 | Winters | G06Q 50/28 705/26.81 |
| 2015/0193859 A1* | 7/2015 | Colello | G06Q 30/0635 705/14.23 |
| 2015/0206113 A1* | 7/2015 | Stoll | G06Q 30/0609 705/26.1 |
| 2015/0206211 A1* | 7/2015 | Stoll | G06Q 30/0601 705/26.1 |
| 2015/0206225 A1* | 7/2015 | Stoll | G06Q 30/0631 705/26.7 |
| 2015/0220979 A1* | 8/2015 | Ouimet | G06Q 30/0633 705/14.49 |
| 2016/0005084 A1* | 1/2016 | Ryan | G06Q 30/0277 705/14.54 |
| 2016/0063611 A1* | 3/2016 | Davis | G06F 16/532 705/26.63 |
| 2016/0086128 A1* | 3/2016 | Geiger | G06Q 10/063118 705/7.17 |
| 2016/0104105 A1* | 4/2016 | Howe | G06Q 10/0832 705/332 |
| 2016/0239888 A1* | 8/2016 | Silver | G06Q 30/0609 |
| 2017/0220681 A1* | 8/2017 | Daas | G06F 40/186 |
| 2017/0236088 A1* | 8/2017 | Rao | G06Q 10/063112 705/7.17 |
| 2017/0278062 A1* | 9/2017 | Mueller | G06Q 30/0631 |
| 2017/0323262 A1* | 11/2017 | Hillis | G06Q 10/0834 |
| 2018/0025319 A1 | 1/2018 | Lievens et al. | |
| 2018/0046982 A1 | 2/2018 | Li et al. | |
| 2018/0315002 A1* | 11/2018 | Rotman | G06Q 30/0635 |
| 2018/0365034 A1* | 12/2018 | Becotte, IV | G06F 9/44521 |

OTHER PUBLICATIONS

Yongsung Kim, "Libero: On-the-go Crowdsourcing for Package Delivery," CHI EA '15 Proceedings of the 33rd Annual ACM Conference Extended Abstracts on Human Factors in Computing Systems, 2015, pp. 121-126.

* cited by examiner

SCRAPING NETWORK SITES TO ARRANGE EXPEDITED DELIVERY SERVICES FOR ITEMS

BACKGROUND

1. Technical Field

Present invention embodiments relate to data processing, and more specifically, to scraping network sites to arrange expedited delivery services for items.

2. Discussion of the Related Art

As patrons increasingly purchase items online, the need for delivery services has increased. While many business models use a postal service or package delivery service to deliver items to a customer, there is a growing demand for more responsive delivery services that can provide same-day delivery of purchased items to a customer's residence.

SUMMARY

According to one embodiment of the present invention, a computer system monitors network sites to provide expedited delivery services. Operation of a network site is monitored to determine that an item is being obtained from the network site. The network site is scraped to determine that the item is available at a physical location associated with the network. A courier service is identified to transport the item from the physical location to the delivery location. Delivery of the item is enabled by the courier service to the delivery location. Embodiments of the present invention further include a method and program product for monitoring network sites to provide expedited delivery services in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to data processing, and more specifically, to scraping a network site to provide expedited delivery services for items obtained from the network site. Many vendors operate brick-and-mortar storefronts as well as e-commerce web sites, enabling customers to visit the store in person or browse the store's inventory online. Customers may view and purchase items online and then pick the item up from the nearby store or other associated physical locations; this business model may be referred to as buy online, pick up in store, or BOPIS. A customer may choose to hire a courier to pick up the item from the store or another physical location on the customer's behalf, and bring the purchased item to the customer at a delivery location (e.g., residence, workplace, etc.). However, there is a lack of integration between vendors that provide a BOPIS service and courier organizations that will serve the location of the vendor's store. Present invention embodiments monitor operation of electronic commerce or other network sites and employ screen scraping techniques to determine whether items that are offered for sale on such sites and available for immediate or in-store pick-up can be fulfilled by courier services, thus providing a user with enhanced delivery options for online purchases.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
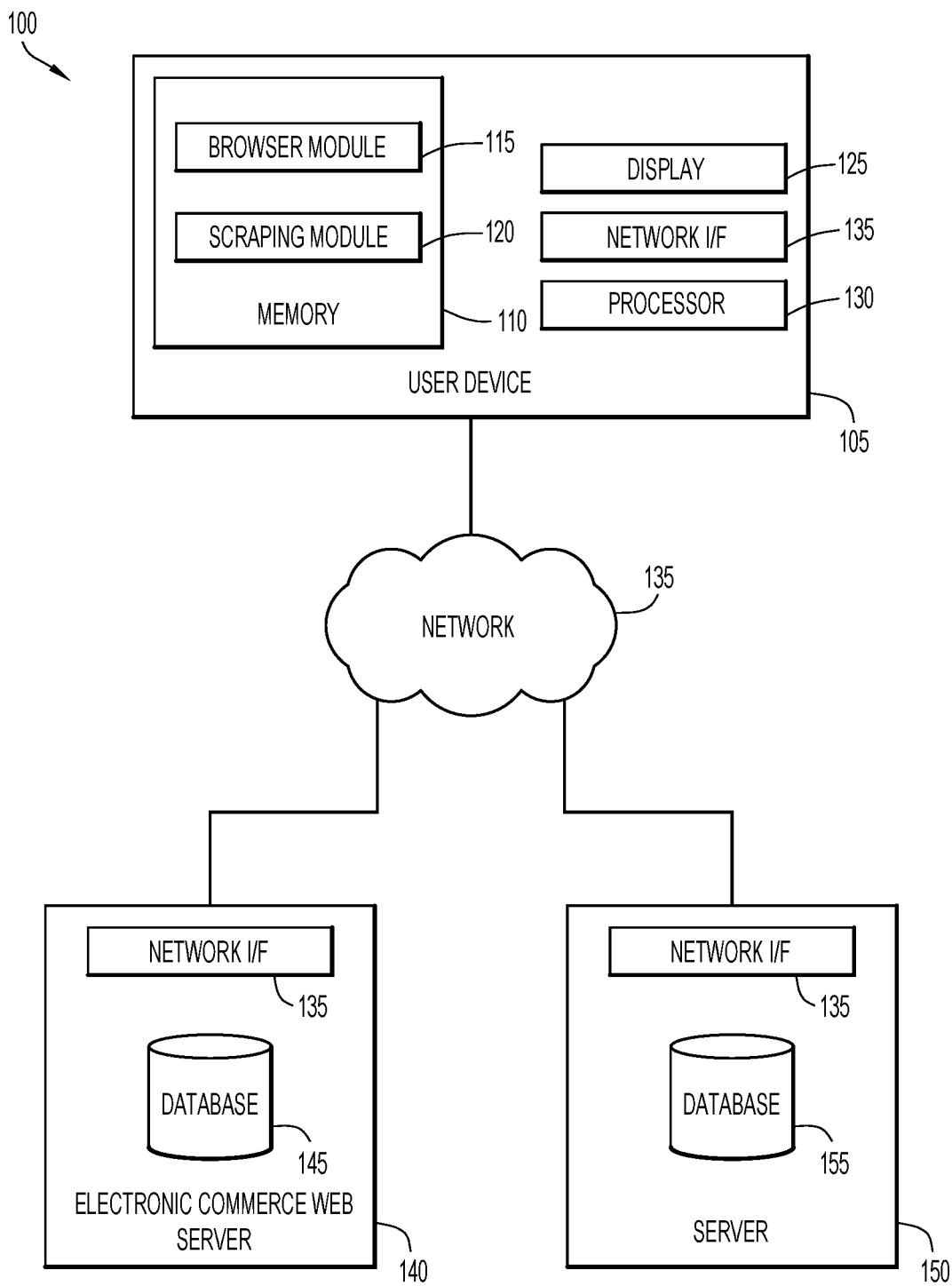
FIG. 1 is a block diagram depicting a computing environment for scraping a network site to provide expedited delivery services for items in accordance with an embodiment of the present invention.

Present invention embodiments will now be described in detail with reference to the Figures. FIG. 1 is a block diagram depicting a computing environment 100 for processing data acquired via scraping to provide enhanced delivery options in accordance with an embodiment of the present invention. As depicted, computing environment 100 includes a user device 105, a network 135, an electronic commerce web server 140, and a server 150. It is to be understood that the functional division among components of computing environment 100 have been chosen for purposes of explaining the present invention and is not to be construed as a limiting example.

User device 105 includes memory 110, a display 125, at least one processor 130, and a network interface 135. Memory 110 includes a browser module 115 and a scraping module 120. In various embodiments of the present invention, user device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 135 enables components of user device 105 to send and receive data over a network, such as network 135. User device 105 may include internal and external hardware components, as depicted and described in further detail with respect to FIG. 4.

Browser module 115 and scraping module 120 may include one or more modules or units to perform various functions of present invention embodiments described below. Browser module 115 and scraping module 120 may be implemented by any combination of any quantity of software and/or hardware modules or units, and may reside within memory 110 of user device 105 for execution by a processor, such as processor 130.

Browser module 115 may include any application for retrieving, presenting, and traversing documents that are accessible over a network, such as an intranet or the World Wide Web. A user of user device 105 may use browser module 115 to access and browse websites. A user may browse to a website offering one or more items for sale that are buy online, pick up in store (BOPIS) eligible. Browser module 115 may include any conventional or other web browser software.

Scraping module 120 may perform screen scraping techniques on network sites visited by browser module 115. A network site may include any network-accessible site that offers goods for purchase, and may be accessible via a web browser or other application. In some embodiments, scraping module 120 is a plug-in application or extension for browser module 115. Scraping module 120 may process a network site, such as an e-commerce website, to determine whether the website sells BOPIS-eligible items. Since each website may be implemented differently, scraping module 120 determines whether a given network site sells BOPIS-eligible items in a retailer-agnostic manner. Scraping module 120 may process the source code of a website by traversing a document object model (DOM) to search elements, text, and attributes for strings from a corpus. The corpus may include phrases such as "available in-store," "pick up today," "pick up in store," "store pickup," "buy online, pickup in store," "BOPIS," and similar permutations. In some embodiments, scraping module 120 may use a string distance algorithm, such as a Jaccard index, to identify phrases that are not included in the corpus, but similar to one or more terms that are on the corpus. For example, the phrase "pick up in our Elm Street location today" may be determined to surpass a threshold level of similarity to the phrase "pick up today," so scraping module 120 may determine that the item is BOPIS-eligible. In some embodiments, when a new phrase surpasses a threshold level of similarity with respect to another phrase that is included on the corpus, the new phrase is added to the corpus. Scraping module 120 may store a corpus locally on user device 105 and/or may access a corpus maintained on a remote server.

Network 135 may include a local area network (LAN), a wide area network (WAN) such as the Internet, or a combination of the two, and includes wired, wireless, or fiber optic connections. In general, network 135 can be any combination of connections and protocols that will support communications between user device 105, electronic commerce web server 140, and server 150 in accordance with embodiments of the present invention.

Electronic commerce web server 140 includes a network interface 135 and a database 145. In general, users may access one or more web pages hosted by electronic commerce web server 140 using a web browser, such as browser module 115, in order to engage in electronic commerce. Scraping module 120 of user device 105 may access and scrape web pages hosted by electronic commerce web server 140 to seek information relating to the BOPIS eligibility of goods. Electronic commerce web server 140 may include internal and external hardware components, as depicted and described in further detail with respect to FIG. 4.

Database 145 may include any non-volatile storage media known in the art. For example, database 145 can be implemented with a tape library, optical library, one or more independent hard disk drives, or multiple hard disk drives in a redundant array of independent disks (RAID). Similarly, data on database 145 may conform to any suitable storage architecture known in the art, such as a file, a relational database, an object-oriented database, and/or one or more tables. Database 145 may store data corresponding to one or more web sites which include listings of items being offered for sale by a vendor who is operating electronic commerce web server 140, along with images of items, prices of items, shipping fees for items, indications of whether a given item is in stock, indications of whether a given item is BOPIS-eligible, and the like.

Server 150 includes a network interface 135 and a database 155. In general, server 150 may provide a central location for the collation of data relating to one or more courier services, such as geographical areas serviced by courier services, pricing information for courier services, scheduling and availability information for courier services, user-provided reviews and/or comments for courier services, and any other information relating to courier services. When a user of user device 105 selects a BOPIS-eligible item on an electronic commerce server, browser module 115 or scraping module 120 may access server 150 to request information relating to courier services that serve the area where the BOPIS-eligible item is physically located. Server 150 may include internal and external hardware components, as depicted and described in further detail with respect to FIG. 4.

Database 155 may include any non-volatile storage media known in the art. For example, database 155 can be implemented with a tape library, optical library, one or more independent hard disk drives, or multiple hard disk drives in a redundant array of independent disks (RAID). Similarly, data on database 155 may conform to any suitable storage architecture known in the art, such as a file, a relational database, an object-oriented database, and/or one or more tables. Database 155 may store data collated by server 150 that relates to one or more courier services, such as the geographical areas serviced by courier services, pricing information for courier services, scheduling and availability information for courier services, user-provided reviews and/or comments for courier services, and any other information relating to courier services. In some embodiments, conventional or other web scraping techniques may be used to locate courier services that offer same-day or other delivery in the area of the user's delivery location and/or the store location selected by the user.

Figure 2:
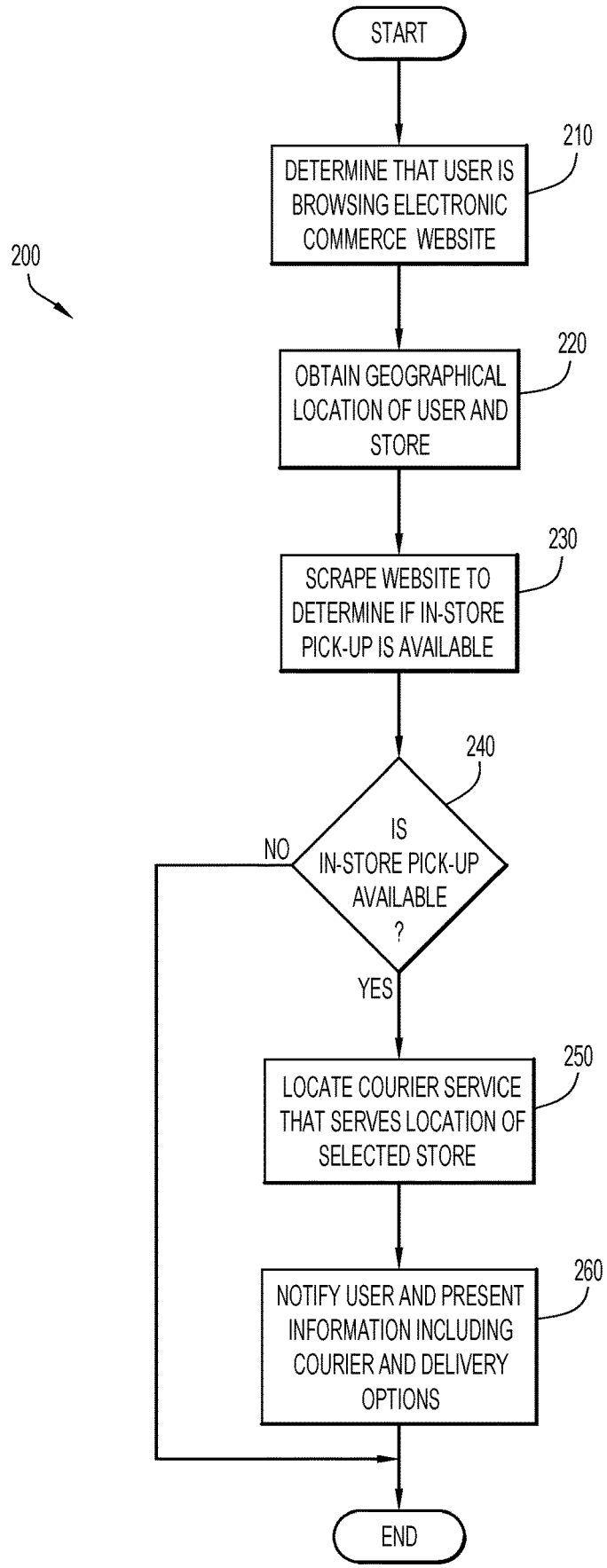
FIG. 2 is a flow chart depicting a method of scraping a network site to provide expedited delivery services for items in accordance with an embodiment of the present invention.

FIG. 2 is a flow chart depicting a method 200 of processing data acquired via scraping to provide enhanced delivery options in accordance with an embodiment of the present invention.

Operation 210 monitors operations of an electronic commerce or other network site and determines that a user is browsing an electronic commerce website (or attempting to obtain an item from an electronic commerce website), such as electronic commerce web server 140. In some embodiments, browser module 115 and/or scraping module 120 may identify an electronic commerce website according to the uniform resource locator of the website currently being browsed by a user of user device 105. The uniform resource locator may be compared to a list of known electronic commerce websites. In some embodiments, a user's browsing of an electronic commerce website is detected according to the presence of indicators on the website, such as keywords, payment gateways, prices, purchase buttons, and the like.

The geographical location of a user (or a delivery location) and a store are obtained at operation 220. When a user browses to an electronic commerce web server 140, browser module 115 may prompt the user for permission to access the user's location information. In some embodiments, a user may enter a geographical indicator, such as the user's residential address or zip code. Additionally or alternatively to providing a user's location, the user may provide a delivery location. For example, an electronic commerce website may request a user's desired location of delivery to show store locations in proximity to the delivery location. In some embodiments, user device 105 is provided with a global positioning system (GPS) tracker that provides the location of user device 105, including a longitude, latitude, and/or altitude.

The website is scraped to determine if in-store pick-up is available at operation 230. Since each electronic commerce website may be different, there may not be an indicator of BOPIS eligibility that can be consistently located across websites. However, by scraping an electronic commerce website, indicators of BOPIS eligibility can be found without requiring scraping module 120 to be provided with prior knowledge of where a particular website might indicate BOPIS eligibility for an item. Thus, scraping techniques can be utilized to determine whether any electronic commerce website provides a buy-online and pick-up in-store model for any of the items listed on its web pages. One or more web pages of electronic commerce web server 140 may be retrieved by browser module 115 for local analysis by scraping module 120. Once a web page is retrieved, scraping module 120 may perform a markup search (e.g., a source code search or screen reading) by traversing a DOM tree corresponding to the retrieved web pages of electronic commerce web server 140. The markup search may search for the presence of strings that are included on a corpus of phrases that indicates BOPIS eligibility of an item. For example, a <div> tag may be present in a webpage's markup along with a string such as "data-bopis-eligible=true," a label element may contain the text "Pick this up today," or a global JavaScript window object may contain a key-value dictionary listing in-store availability time ranges across regional stores. When a website is loaded by browser module 115, scraping module 120 may detect when certain portions of the page load and monitor for certain criteria (e.g., the presence or absence of strings indicating BOPIS eligibility for items). The markup search may search for text in any readable format, including text that is in images or other media formats. In some embodiments, browser module 115 includes any application, such as a mobile application, desktop application, web browsing application, and the like, that enables a user to browse one or more network sites that facilitates electronic commerce.

In some embodiments, a markup search also searches for strings that are statistically similar (e.g., beyond a threshold degree of similarity) to strings that are listed on the corpus. When scraping module 120 discovers a string that indicate BOPIS availability, scraping module 120 may associate that string with a particular item being offered for sale. For example, if there are multiple items on a page, scraping module 120 may determine which items in particular are BOPIS-eligible by determining which item is most associated with a string indicating BOPIS eligibility. For example, if a string indicates that an item on a web page is BOPIS-eligible, scraping module 120 may locate the item that is closest to the string by measuring a distance in terms of pixels of a displayed web page or in terms of characters in a source code.

Operation 240 determines whether in-store pick-up is available for a particular item. If the item is BOPIS-eligible, as indicated by the markup search finding one or more terms conveying BOPIS eligibility, then method 200 proceeds to operation 250.

A courier service that serves the location of the selected store is located at operation 250. Database 155 of server 150 may be queried to obtain one or more courier services that offer same-day pick-up and delivery from the location of the selected store and the user's delivery location. Server 150 may process the query and return the results to user device 105, including any courier services that serve the geographical area of the user's selected delivery location and the selected store location.

A notification is sent to the user along with information including the courier service and delivery options at operation 260. A courier service may be presented to the user along with a price quote before the user enters payment information. When the courier service is presented to the user, the user may also be presented with an option to bundle the courier service fee with the order at checkout. In some embodiments, the user is presented with multiple courier services and may have the opportunity to review the courier services according to metrics such as price or delivery quote, speed of delivery, average customer review, and the like. When the user selects a courier service and checks out, the courier service may receive a notification that includes the user's requested delivery location and the address of the store fulfilling the order. In some embodiments, the user may be presented with a street map including markers at coordinates corresponding to the store fulfilling the order and the user's delivery address, the name of the courier service that is picking up the item or items, a delivery stage (e.g., "item being prepared in warehouse," "courier is en route to your address," etc.), and the like. In some embodiments, when a user browses to an electronic commerce website via browser 115, scraping module 120 dynamically alters the website's appearance, flow, and/or configuration in order to agnostically integrate the offering of third-party courier services into any vendor's electronic commerce website. For example, scraping module 120 may add an interface element in proximity to a BOPIS-eligible item that enables a user to initiate the process of purchasing of the item and hiring of a courier service. Scraping module 120 may also add an additional layer to the check-out process in which a user can hire a courier service to pick up a purchased item and bring it to the user's selected delivery location; the courier service fee may or may not be bundled together with the purchasing of the item(s). Scraping module 120 may add overlays to the website to facilitate any additional elements involving the hiring of a courier service. In some embodiments, scraping module 120 may access a server of a courier service via, for example, an application programming interface (API) such as a representational state transfer (RESTful API); scraping module 120 may provide the server of the courier service with information pertaining to the user's order, such as the item requested, and pick-up and delivery addresses, as well as payment information.

In some embodiments, information relating to a courier service is automatically inserted into fields on a web page of electronic commerce web server 140. For example, the name of the courier service and/or the name of a particular courier employed by a service may be added to a name field so that the vendor operating the electronic commerce web server 140 will know to entrust the vendor with the user's purchased goods (e.g., as a bailee). In some embodiments, the courier service and/or name of a particular courier employed by a service is assigned a unique hash that references the courier or courier service; for example, instead of "Jane Doe," a phrase including a hash, such as "bundle courier #37f2" may be used.

Figure 3:
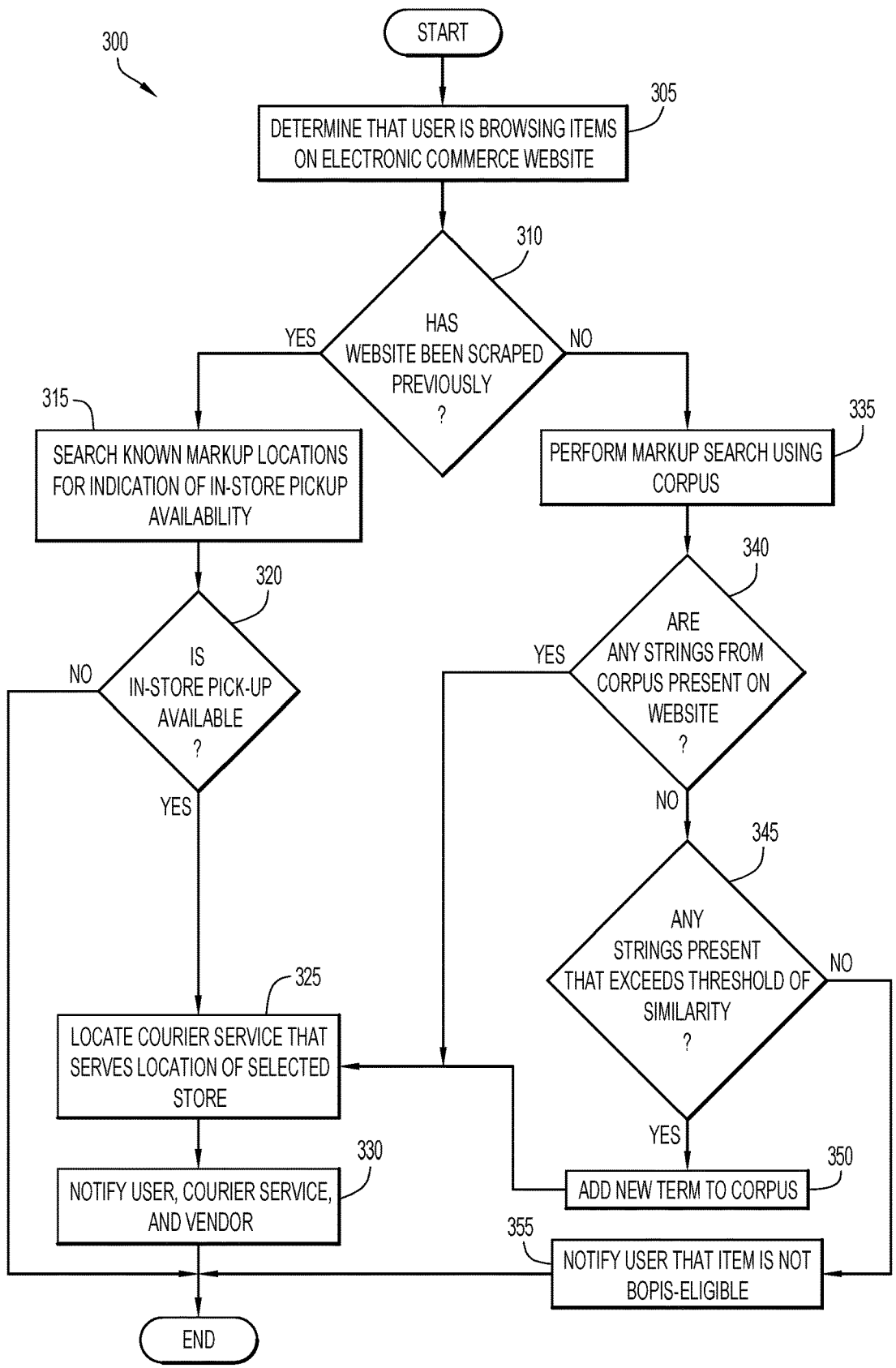
FIG. 3 is a flow chart depicting a method of scraping a website in accordance with an embodiment of the present invention.

FIG. 3 is a flow chart depicting a method 300 of scraping a website in accordance with an embodiment of the present invention.

Operation 305 determines that a user is browsing one or more items listed on an electronic commerce website. In some embodiments, browser module 115 and/or scraping module 120 may identify an electronic commerce website according to the uniform resource locator of the website currently being browsed by a user of user device 105. The uniform resource locator may be compared to a list of known electronic commerce websites. In some embodiments, a user's browsing of an electronic commerce website is detected according to the presence of indicators on the website, such as keywords, payment gateways, prices, purchase buttons, and the like.

Operation 310 determines whether the website has been scraped previously. Scraping module 120 may maintain a list of websites that have been scraped previously. In some embodiments, user device 105 may query database 155 of server 150 to determine if a website has been previously scraped.

If an electronic commerce website has been previously scraped, known markup or source code locations are searched for an indication of in-store pick-up availability for a particular item at operation 315. When scraping module 120 scrapes a website, scraping module 120 may discover known markup locations where strings are located that indicate BOPIS eligibility for an item. Scraping module 120 may save any known markup locations that it discovers for future use, so that the next time a user browses a website, known locations may be quickly checked for indicators of BOPIS eligibility.

Operation 320 determines whether in-store pick-up is available for the selected item. Scraping module 120 may check the known markup locations to determine whether an item is BOPIS-eligible.

A courier service that serves the location of the selected store is located at operation 325. Database 155 of server 150 may be queried to obtain one or more courier services that offer pick-up and delivery from the location of the selected store to the user's delivery location. In some embodiments, the courier service offers same-day delivery, or a delivery schedule can be provided according to a user's request. Server 150 may process the query and return the results to user device 105, including any courier services that serve the geographical area of the user's selected delivery location and the selected store location.

A notification is sent to the user, the vendor operating electronic retail web server 140, and/or a courier service at operation 330. The user may be notified that the BOPIS-eligible item will be picked up by a courier service and delivered to the location specified by the user. The user may also be notified of any pricing information for the purchased item and/or courier service, and the estimated time of delivery. In some embodiments, a vendor operating electronic commerce web server 140 is notified of the courier service selected by a user, which may be identified by a name or by a hash corresponding to the courier service. The courier service may be notified of the user's request for one or more items to be picked up from the store fulfilling the order and delivered at a delivery location provided by the user.

When an electronic commerce website has not been previously scraped, a markup or source code search is performed using a corpus at operation 335. The corpus may include a list of strings that each indicate that an item is BOPIS-eligible, such as "buy online, and pick up in this location," "order here and pick up today," and the like. The markup search continues until scraping module 120 has searched for each entry in the corpus.

Operation 340 determines whether any strings included in the corpus are present in any locations of the electronic commerce website that list the selected item. If a string included in the corpus is present, then in-store pick-up is available, and method 300 proceeds accordingly.

Operation 345 determines whether there are any strings present in the electronic commerce website's listing the selected item that exceed a threshold of similarity with respect to a corpus string. The degree of similarity of two strings may be calculated using an algorithm such as a Jaccard index (also known as a Jaccard similarity coefficient), which performs an intersection over union operation to determine the similarity of a string appearing on a webpage to a string included in the corpus. For example, the string "Purchase in-store today!" may be included on the corpus, and may be calculated to match a non-identical string on a webpage, "Purchase this item online and pick up in-store today!" with a similarity value of 62%. If a similarity threshold is 60%, then method 300 proceeds to operation 350, and the latter phrase is added to the corpus. The similarity threshold may be predetermined or user-defined. In some embodiments, a feedback loop is implemented using conventional or other machine learning techniques in order to automatically classify new BOPIS-indicating terms and markup classes. The machine learning model may be trained by ingesting a selection of electronic commerce websites, and may use supervised or unsupervised learning. If no strings are present that exceed a threshold of similarity, then the user may be notified that the selected item is not BOPIS-eligible at operation 355.

Figure 4:
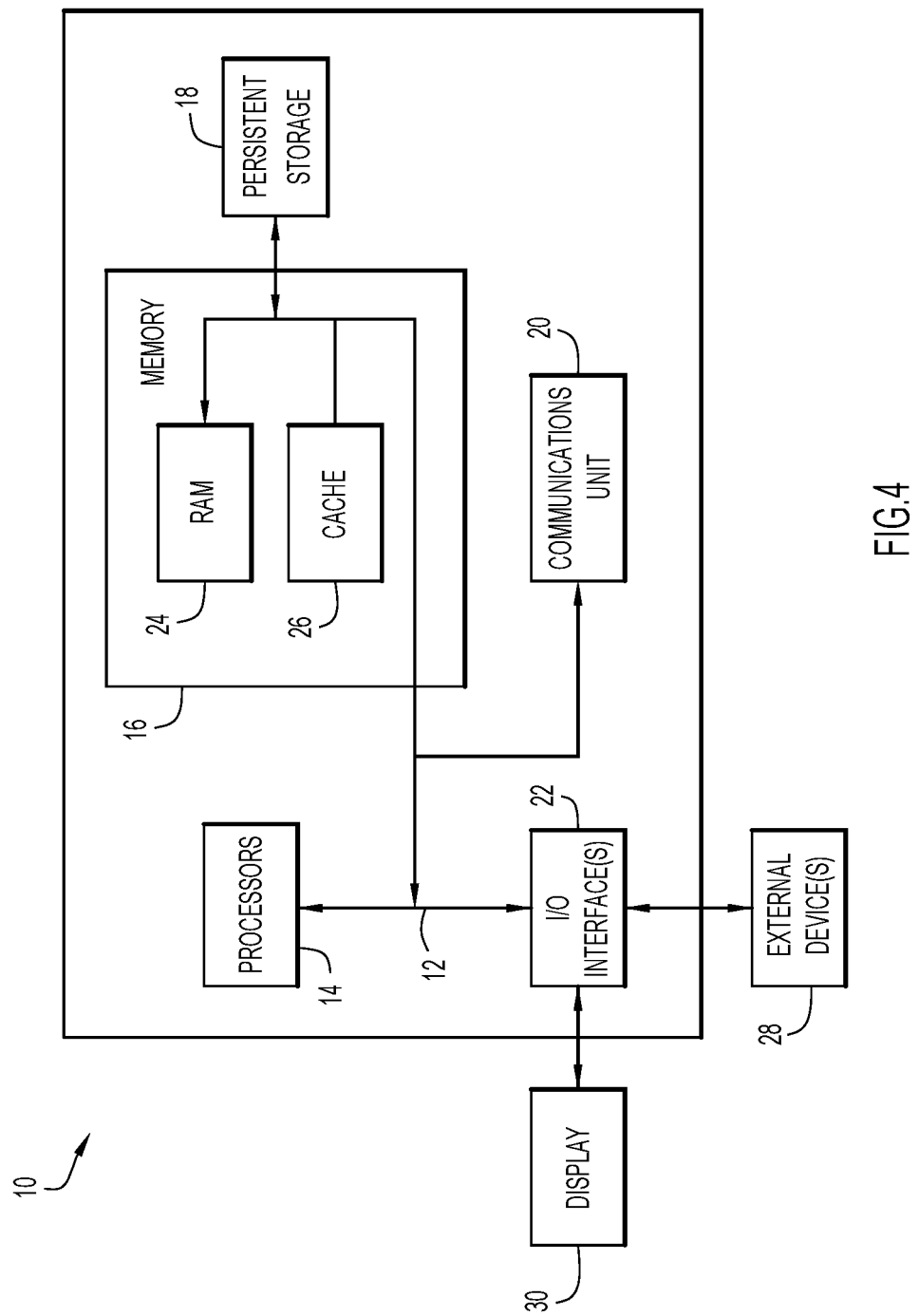
FIG. 4 is a block diagram depicting a computing device in accordance with an embodiment of the present invention.

FIG. 4 is a block diagram depicting components of a computer 10 suitable for executing the methods disclosed herein. Computer 10 may implement user device 105, electronic commerce web server 140, and/or server 150 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to scraping network sites (e.g., electronic commerce data, courier service data, corpus data, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105, electronic commerce web server 140, and server 150 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to scraping network sites (e.g., electronic commerce data, courier service data, corpus data, etc.) may include any information provided to, or generated by, user device 105, electronic commerce web server 140, and/or server 150. Data relating to scraping network sites may include any desired format and arrangement, and may include any quantity of any types of fields of any size to store any desired data. The data relating to enhanced delivery options may include any data collected about entities by any collection means, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of scraping network sites to arrange expedited delivery services for items.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser module 115, scraping module 120, machine learning software, etc.). These systems may include any types of monitors and input devices (e.g., keyboard, mouse, voice recognition, etc.) to enter and/or view information.

It is to be understood that the software (e.g., browser module 115, scraping module 120, machine learning software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., browser module 115, scraping module 120, machine learning software, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to providing enhanced delivery options). The database system may be implemented by any number of any conventional or other databases, data stores or storage structures (e.g., files, databases, data structures, data or other repositories, etc.) to store information (e.g., data relating to providing enhanced delivery options). The database system may be included within or coupled to the server and/or client systems. The database systems and/or storage structures may be remote from or local to the computer or other processing systems, and may store any desired data (e.g., data relating to providing enhanced delivery options).

The present invention embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of monitoring network sites to provide expedited delivery services, the method comprising:
    monitoring operation of a network site to determine that an item is being obtained from the network site, wherein the item is being obtained by a user who is associated with a delivery location, and wherein the user accesses the network site via a browser;
    scraping the network site to determine that the item is available for same-day pick-up at a physical location associated with the network site, wherein the scraping determines the physical location of a plurality of physical locations based on the delivery location of the user, wherein the scraping is performed by an extension of the browser, and wherein the scraping is performed by traversing the network site to identify one or more words or phrases of a corpus of words or phrases indicating same-day pick-up availability;
    identifying a courier service to transport the item from the physical location to the delivery location, wherein the courier service is identified based on the courier service offering same-day pick-up and delivery from the physical location to the delivery location, wherein the courier service is a third-party service with respect to the physical location, and wherein the courier service is identified by scraping one or more courier service websites; and
    enabling delivery of the item by the courier service to the delivery location.

2. The computer-implemented method of claim 1, further comprising:
    receiving a request from the user for the item for which in-store pick-up is available; and
    sending a message to the identified courier service to transport the item from the physical location to the delivery location.

3. The computer-implemented method of claim 1, further comprising:
    receiving a request from the user for the item for which in-store pick-up is available; and
    presenting to the user one or more courier services that are available to transport the item from the physical location to the delivery location.

4. The computer-implemented method of claim 1, wherein scraping the network site comprises analyzing the network site to identify one or more strings that match a string included in a corpus.

5. The computer-implemented method of claim 1, wherein scraping the network site comprises:

analyzing the network site to identify one or more strings that surpass a threshold of similarity to a string included in a corpus; and adding to the corpus each string that surpasses the threshold of similarity to a string included in the corpus.

6. The computer-implemented method of claim 4, wherein scraping the network site comprises:

analyzing the network site and utilizing machine learning to identify one or more strings that indicate that an item is available for in-store pick-up; and adding to the corpus each of the identified one or more strings.

7. A computer system for monitoring network sites to provide expedited delivery services, the computer system comprising:

one or more computer processors;

one or more computer readable storage media;

program instructions stored on the one or more computer readable storage media for execution by at least one of the one or more computer processors, the program instructions comprising instructions to:

monitor operation of a network site to determine that an item is being obtained from the network site, wherein the item is being obtained by a user who is associated with a delivery location, and wherein the user accesses the network site via a browser;

scrape the network site to determine that the item is available for same-day pick-up at a physical location associated with the network site, wherein the scraping determines the physical location of a plurality of physical locations based on the delivery location of the user, wherein the scraping is performed by an extension of the browser, and wherein the scraping is performed by traversing the network site to identify one or more words or phrases of a corpus of words or phrases indicating same-day pick-up availability;

identify a courier service to transport the item from the physical location to the delivery location, wherein the courier service is identified based on the courier service offering same-day pick-up and delivery from the physical location to the delivery location, wherein the courier service is a third-party service with respect to the physical location, and wherein the courier service is identified by scraping one or more courier service websites; and enable delivery of the item by the courier service to the delivery location.

8. The computer system of claim 7, further comprising instructions to:

receive a request from the user for the item for which in-store pick-up is available; and send a message to the identified courier service to transport the item from the physical location to the delivery location.

9. The computer system of claim 7, further comprising instructions to:

receive a request from the user for the item for which in-store pick-up is available; and present to the user one or more courier services that are available to transport the item from the physical location to the delivery location.

10. The computer system of claim 7, wherein the instructions to scrape the network site comprise instructions to analyze the network site to identify one or more strings that match a string included in a corpus.

11. The computer system of claim 7, wherein the instructions to scrape the network site comprise instructions to:

analyze the network site to identify one or more strings that surpass a threshold of similarity to a string included in a corpus; and add to the corpus each string that surpasses the threshold of similarity to a string included in the corpus.

12. The computer system of claim 10, wherein the instructions to scrape the network site comprise instructions to:

analyze the network site utilizing machine learning to identify one or more strings that indicate that an item is available for in-store pick-up; and add to the corpus each of the identified one or more strings.

13. A computer program product for monitoring network sites to provide expedited delivery services, the computer program product comprising one or more computer readable storage media collectively having program instructions embodied therewith, the program instructions executable by a computer to cause the computer to:

monitor operation of a network site to determine that an item is being obtained from the network site, wherein the item is being obtained by a user who is associated with a delivery location, and wherein the user accesses the network site via a browser;

scrape the network site to determine that the item is available for same-day pick-up at a physical location associated with the network site, wherein the scraping determines the physical location of a plurality of physical locations based on the delivery location of the user, wherein the scraping is performed by an extension of the browser, and wherein the scraping is performed by traversing the network site to identify one or more words or phrases of a corpus of words or phrases indicating same-day pick-up availability;

identify a courier service to transport the item from the physical location to the delivery location, wherein the courier service is identified based on the courier service offering same-day pick-up and delivery from the physical location to the delivery location, wherein the courier service is a third-party service with respect to the physical location, and wherein the courier service is identified by scraping one or more courier service websites; and enable delivery of the item by the courier service to the delivery location.

14. The computer program product of claim 13, further comprising instructions to:

receive a request from the user for the item for which in-store pick-up is available; and send a message to the identified courier service to transport the item from the physical location to the delivery location.

15. The computer program product of claim 13, further comprising instructions to:

receive a request from the user for the item for which in-store pick-up is available; and present to the user one or more courier services that are available to transport the item from the physical location to the delivery location.

16. The computer program product of claim 13, wherein the instructions to scrape the network site comprise instructions to analyze the network site to identify one or more strings that match a string included in a corpus.

17. The computer program product of claim 13, wherein the instructions to scrape the network site comprise instructions to:

analyze the network site to identify one or more strings that surpass a threshold of similarity to a string included in a corpus, and further comprising instructions to:

add to the corpus each string that surpasses the threshold of similarity to a string included in the corpus.

18. The computer program product of claim 16, wherein the instructions to scrape the network site comprise instructions to:

analyze the network site utilizing machine learning to identify one or more strings that indicate that an item is available for in-store pick-up; and add to the corpus each of the identified one or more strings.

* * * * *